UNITED STATES PATENT OFFICE 2,354,524

TRIMETHINECYANINE DYESTUFFS

Karl Kumetat, Wolfen, Kreis Bitterfeld, and Oskar Riester, Dessau-Haideburg, Germany, assignors to General Aniline & Film Corporation, New York, N. Y., a corporation of Delaware No Drawing. Application February 17, 1942, Serial No. 431,268. In Germany September 17, 1940

4 Claims. (Cl. 260—240)

Our present invention relates to trimethinecyanine dyestuffs and more particularly to a new method of the production thereof.

Symmetrical and unsymmetrical trimethinecyanines are known to be obtained by reacting anilinovinyl compounds of the general formula:

(I) 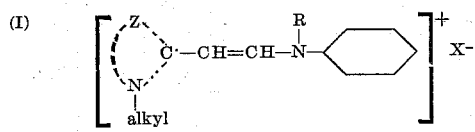

or 2-methene-ω-aldehydes of the general formula:

(II) 

wherein R stands for hydrogen, alkyl or acetyl; Z stands for a group of atoms necessary to complete a 5 or 6-membered ring usual in cyanine dye art, and X stands for an anionic acid radical; with quaternary salts of similar or different heterocyclic compounds containing a reactive alkyl group. These methods cannot be employed in all cases. Unsymmetrical benzimidazoletrimethinecyanines, for instance, can be prepared only by means of compounds of Formula II. In many cases, however, there is reached only a moderate yield. As to other dyestuffs, for instance, some unsymmetrical benzoxazoletrimethinecyanines there is obtained not only a very small yield but impure products as well due to the presence of symmetrical dyestuffs when resorting to the process involving the compounds of Formula II. In this case the production of the cyanines has been accomplished by means of compounds of Formula I. But this process also often results in moderate yields.

We have found that symmetrical and unsymmetrical trimethinecyanines are obtained more easily and with a better yield by reacting compounds corresponding to the general formula:

(III) 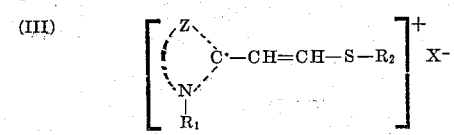

wherein Z means a group of atoms necessary to complete a 5- or 6-membered ring usual in the cyanine dye art as, for instance, indoline, oxazole, thiazole, selenazole, oxazoline, thiazoline, selenazoline, pyridine, lepidine, imidazole, quinoline or thiodiazole; these heterocyclic radicals may carry substituents such as alkyl, aryl, benzyl, phenylene, naphthylene and substituted phenyls or heterocyclic radicals or may be condensed with aromatic or heterocyclic rings; $R_1$ and $R_2$ mean alkyl or aralkyl, and X means an anionic acid radical, for instance, Cl, Br, I, $ClO_4$, $SO_4$, $SO_3CH_3$, $SO_3C_2H_5$, $SO_3C_6H_4.CH_3$; with quaternary salts of similar or different heterocyclic nitrogenous compounds containing a reactive alkyl group in the α- or γ-position to the nitrogen atom in the presence of an alkaline condensing agent as, for instance, pyridine, quinoline, isoquinoline, picoline or amines such as triethylamine. The compounds of Formula III serving as starting materials may be prepared by the process described in U. S. Patent No. 2,349,179. From some quaternary salts of heterocyclic bases as, for instance, the addition products of ω-halogen-fatty acids to heterocyclic bases pure crystallized dyestuffs can be obtained in a sufficient yield only by compounds of Formula III.

The following examples illustrate the present invention but they are not intended to limit it thereto.

Example 1

A dyestuff of the following formula:

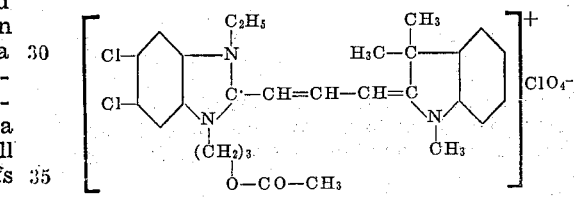

is produced as follows: A mixture of 3.0 g. (1/100 mol) of 1-acetoxypropyl-2-methyl-5.6-dichlorobenzimidazole and 1.3 cc. of diethylsulfate is heated at 120° C. for 20 minutes. To the mixture 12 cc. of pyridine, 1.5 cc. of triethylamine and 3.3 g. of a compound of the following formula:

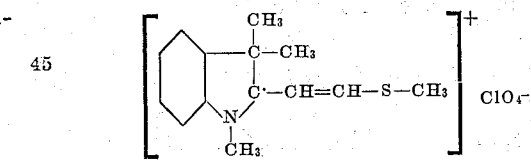

are added thereto. The whole is boiled for 60 minutes and then cooled. The dyestuff is precipitated with an aqueous sodium perchlorate solution of 20% strength. The dyestuff is recrystallized from methanol. Absorption maximum in methanol: 490 mμ–520 mμ.

Example 2

A dyestuff of the following formula:

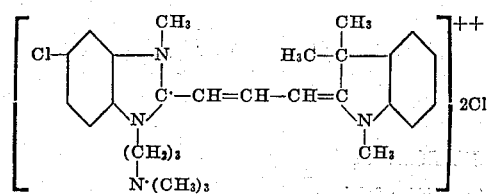

is obtained in a manner analogous to that as described in Example 1 by using as the quaternary heterocyclic compound $1/100$ mol of 2.3-dimethyl-1-(trimethylammoniumpropyl)-5-chlorobenzimidazoliummethylsulfate. Absorption maximum in methanol: 485–510 mμ.

Example 3

A dyestuff of the following formula:

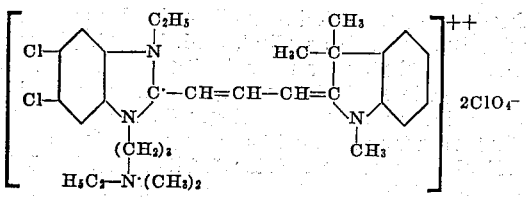

is produced in a manner analogous to that as described in Example 1 by using as the quaternary heterocyclic compound a quaternary salt of the following constitution:

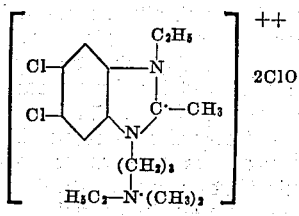

Absorption maximum in methanol: 490–520 mμ.

Example 4

A dyestuff of the following formula:

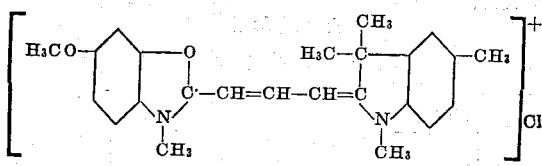

is prepared as follows: A mixture of $1/100$ mol of 2-methyl-5-methoxybenzoxazoleethyliodide and $1/100$ mol of a compound of the following formula:

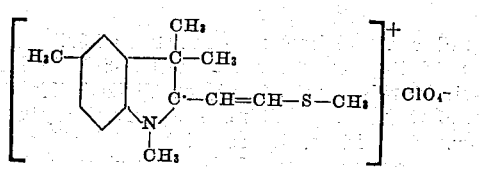

is boiled in pyridine for 90 minutes.

Example 5

A dyestuff of the following formula:

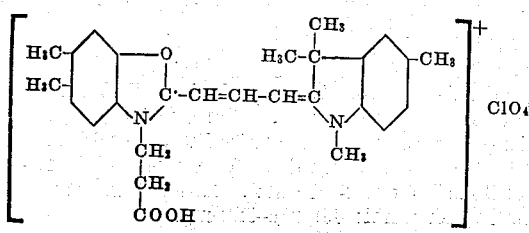

is prepared in the following manner: A mixture of 4 g. of the addition product of β-bromopropionic acid, to 2.5.6-trimethylbenzoxazole of the following formula:

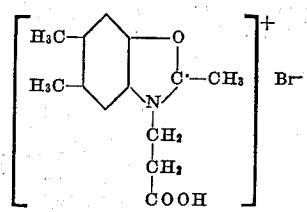

and 3.4 g. of 1.3.3.5-tetramethyl-2-(ω-methylmercapto)-etheneindoliniumperchlorate corresponding with the second formula of Example 4 is heated with 10 cc. of pyridine at 100° C. for 25 minutes. On addition of 30 cc. of a 4-normal aqueous sodium perchlorate solution and 30 cc. of acetic acid of 10% strength the dyestuff is caused to crystallize out. It is recrystallized from propanol. Absorption maximum in methanol: 518 mμ.

Example 6

A dyestuff of the following formula:

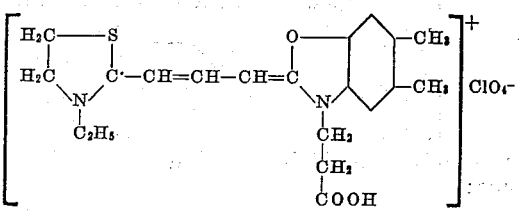

is prepared as follows: A mixture of the benzoxazole addition product mentioned in Example 5 and 3 g. of N-ethyl-2(ω-methylmercapto)-ethenethiazoliniumperchlorate of the formula:

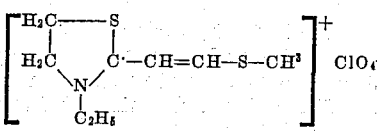

is heated with 10 cc. of pyridine at 100° C. for 45 minutes. After addition of 10 cc. of a 4-normal aqueous perchlorate solution and 50 cc. of acetic acid of 10% strength the whole is cooled with ice for 5 hours. The precipitated dyestuff is recrystallized from methanol. Absorption maximum in methanol: 476 mμ.

Example 7

A dyestuff of the following formula:

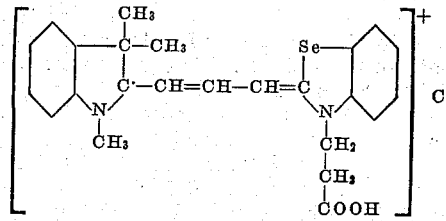

is obtained in the following manner: A mixture of 4 g. of the addition compound from β-iodopropionic acid and 2-methylbenzselenazole of the formula:

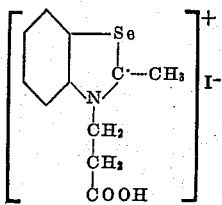

and 3.3 g. of 1.3.3-trimethyl-2-(ω-methylmercapto)-etheneindoliniumperchlorate is heated with 10 cc. of pyridine and 1 cc. of triethylamine at 105° C. for half an hour. To the hot solution there are added 30 cc. of an aqueous sodium perchlorate solution of 50% strength and 40 cc. of acetic acid of 10% strength. The dyestuff obtained forms green lustrous crystals and is recrystallized from methanol. Absorption maximum in methanol: 550 mμ.

*Example 8*

A dyestuff of the formula:

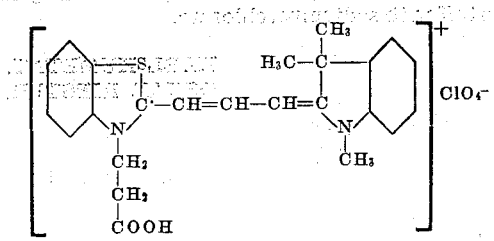

is produced in the following manner: A mixture of 3.3 g. of the addition compound from β-bromopropionic acid and 2-methylbenzthiazole of the formula:

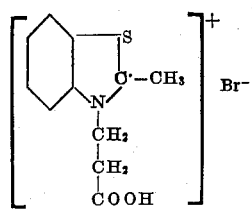

and 3.3 g. of 1.3.3-trimethyl-2-(ω-methylmercapto)-etheneindoliniumperchlorate is heated with 10 cc. of pyridine at 105° C. in an oil bath for half an hour. On addition of 30 cc. of a 4-normal aqueous sodiumperchlorate solution and 20 cc. of acetic acid of 10% strength the dyestuff is caused to crystallize. It is recrystallized from propanol. Absorption maximum in methanol: 545 mμ.

*Example 9*

A dyestuff of the formula:

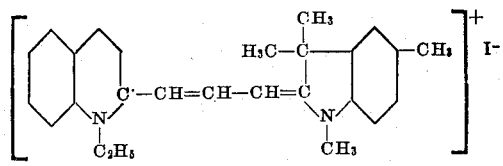

is obtained by heating 1/100 mol of quinaldine ethyliodide with 1/100 mol of 1.3.3.5-tetramethyl-2-(ω-methylmercapto)-etheneindolinium ethyliodide in a mixture of pyridine and triethylamine at 70° C. Absorption maximum in methanol: about 590 mμ.

We claim:

1. A process of preparing trimethinecyanines which comprises reacting compounds of the general formula:

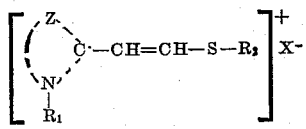

wherein Z means a group of atoms necessary to complete a ring usual in the cyanine dye art, said ring being selected from the class consisting of 5- and 6-membered rings; $R_1$ and $R_2$ mean an alkyl, and X means an anionic acid radical; with quaternary salts of nitrogenous heterocyclic compounds containing a reactive alkyl group in a position selected from the group consisting of α- and γ-positions to the nitrogen atom in the presence of alkaline condensing agents.

2. A process of preparing a trimethinecyanine dyestuff of the formula:

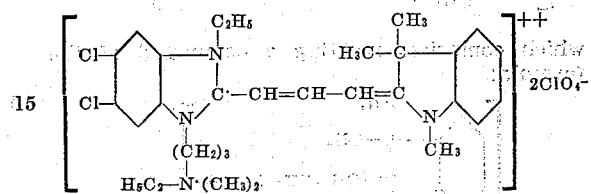

which comprises reacting a compound of the formula:

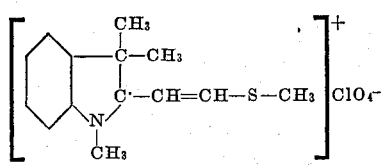

with a compound of the formula:

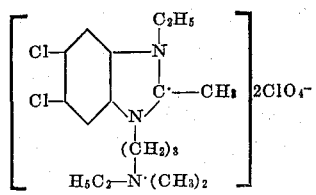

in the presence of a mixture of pyridine and triethylamine and precipitating the dyestuff with sodiumperchlorate.

3. A process of preparing a trimethinecyanine dyestuff of the formula:

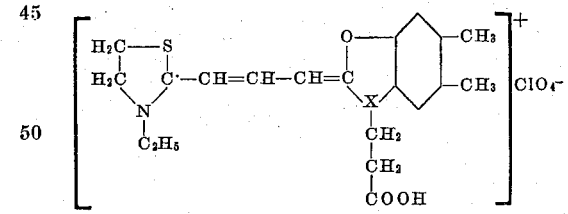

which comprises reacting a compound of the formula:

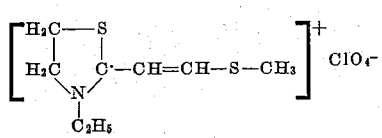

with a compound of the formula:

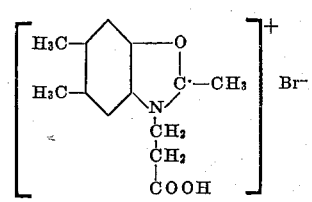

in the presence of pyridine and precipitating the dyestuff with a sodiumperchlorate.

4. A process of preparing a trimethinecyanine dyestuff of the formula:
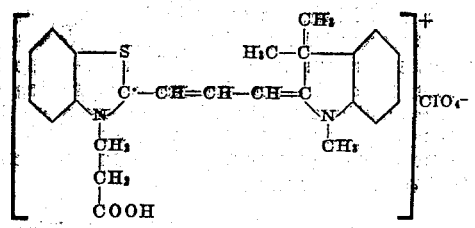
which comprises reacting a compound of the formula:
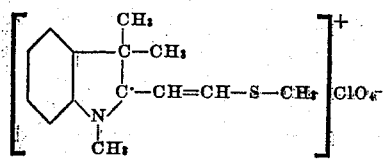
with a compound of the formula:
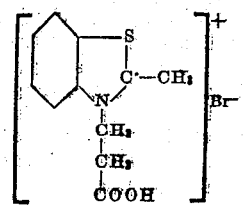
in the presence of pyridine and precipitating the dyestuff with sodiumperchlorate.
KARL KUMETAT.
OSKAR RIESTER.